B. B. NEUTEBOOM.
VEHICLE SEAT SUPPORT.
APPLICATION FILED AUG. 28, 1918.
1,428,652.
Patented Sept. 12, 1922.
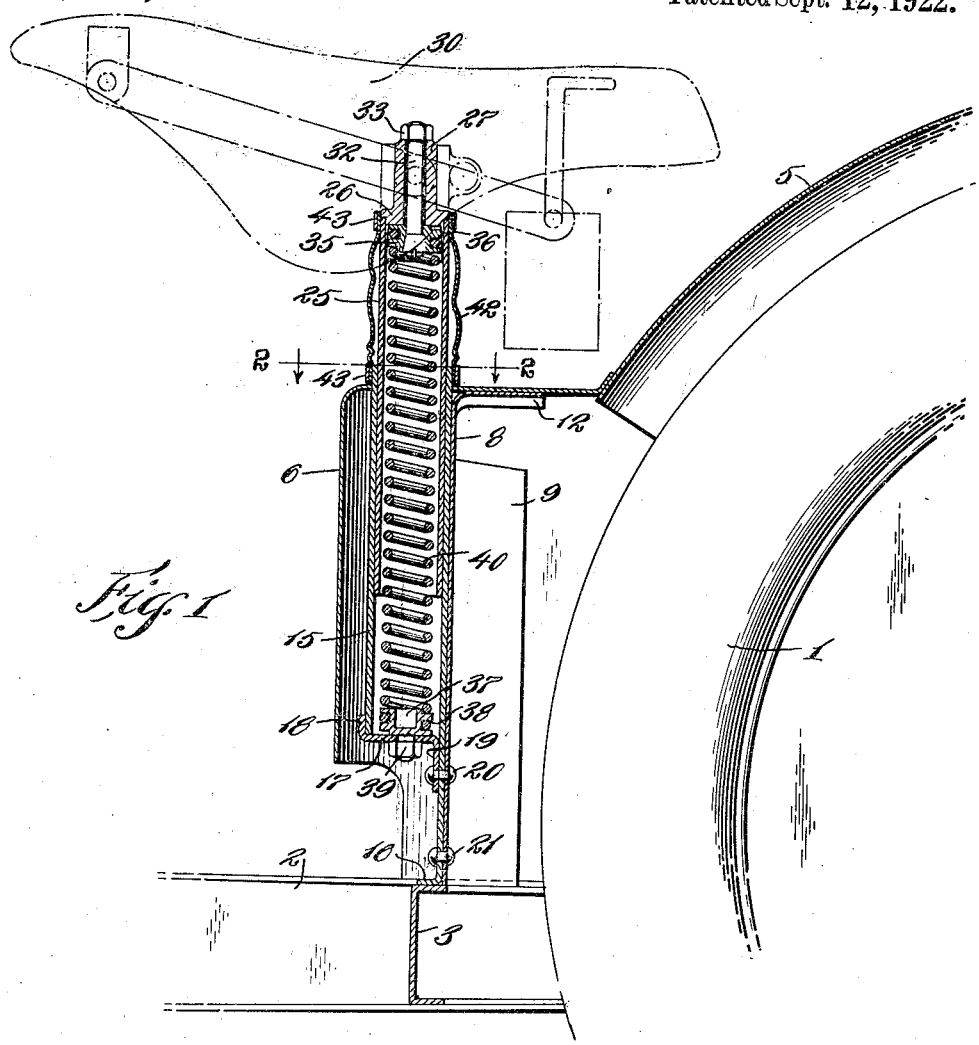
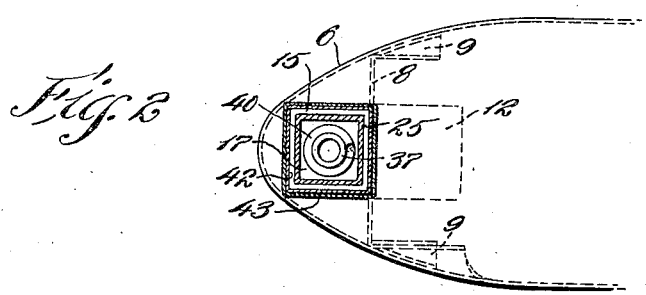
Inventor
Boudewijn B. Neuteboom.
By Hull, Smith, Brock & West
Attys.

Patented Sept. 12, 1922.

1,428,652

UNITED STATES PATENT OFFICE.

BOUDEWIJN B. NEUTEBOOM, OF DETROIT, MICHIGAN, ASSIGNOR, BY MESNE ASSIGNMENTS, TO SINCLAIR MOLITOR CORPORATION, NEW YORK, N. Y., A CORPORATION OF DELAWARE.

VEHICLE SEAT SUPPORT.

Application filed August 28, 1918. Serial No. 251,728.

*To all whom it may concern:*

Be it known that I, BOUDEWIJN B. NEUTEBOOM, a subject of the Queen of the Netherlands, residing at Detroit, in the county of Wayne and State of Michigan, have invented a certain new and useful Improvement in Vehicle Seat Supports, of which the following is a full, clear, and exact description, reference being had to the accompanying drawings.

This invention relates to vehicle seat supporting means especially desirable for use in motorcycles and accordingly shown in such connection herein.

The objects of the invention are to provide resilient seat supporting means involving a shock absorbing feature which mollifies the action of the supporting means and thus contributes to the comfort of the rider; to provide seat supporting means of the aforesaid character that is comparatively simple of construction, involving few parts, and those of such nature as to render the structure durable, easy to assemble, and thoroughly substantial and reliable; and to provide, in such means, protection against the admission of dust or dirt to the working parts.

To the foregoing ends my invention may be defined as consisting of the combinations of elements set forth in the claims annexed hereto and illustrated in the drawing accompanying and forming a part hereof and wherein Fig. 1 is a central vertical section through my improved seat supporting means and the adjacent parts of a motorcycle wherein it is incorporated; and Fig. 2 is a sectional detail on the line 2—2 of Fig. 1, looking downward.

A portion of the rear wheel of the motorcycle is indicated at 1, and the frame at 2, the latter involving a transverse member 3. A mud guard 5 is disposed above the wheel and its forward end is connected to a shell 6, the lower end of the shell being attached in any suitable manner to the frame of the vehicle. A plate 8 is disposed transversely of the shell 6 and rises within the same from the rear edge of the transverse frame member 3, the side edges of the plate being turned rearwardly as shown at 9 for contact with and connection to the sides of the shell 6. The connection between the plate and shell may be made by any suitable method, as by welding. A tongue 12 extends rearwardly from the upper end of the plate and is attached to the top of the shell.

A casing 15, consisting in the present instance of a tube that is square in cross-section, is adapted to be inserted downward through a correspondingly shaped opening in the top wall of the shell 6 until the upper end of the casing is only slightly above the shell, while the forwardly turned bottom edge portion 16 of its rear elongated side wall bears upon the transverse frame member 3. The bottom 17 of the casing consists of a member that is flanged upwardly along its side and front edges, as indicated at 18, and downward at the rear, as indicated at 19, where it is connected, as by a rivet 20, to the elongated side of the casing and to the plate 8 wherewith such side engages, a rivet 21 connecting said side to the plate immediately above the frame. From the construction thus described it will be seen that the tubular casing 15 is securely held in place, at its upper end by being confined within the aperture of the shell 6, and at its lower end by the rivets 20 and 21; and it is effectually supported by the substantial transverse frame member 3, thus relieving the rivets 20 and 21 of any shearing action.

A tubular plunger 25, of a cross-sectional shape corresponding to that of the casing 15, has a sliding fit in the casing, and at its upper end is effectually closed by a head 26 which is provided with an upwardly extending boss 27 to which a seat or saddle 30 (shown in dot-and-dash lines) may be clamped or otherwise secured.

The head 26 has a vertical bore for the passage of a bolt 32, held in place by a nut 33 that is applied to the upper end of the bolt directly above the boss 27. An anchorage block 35 is carried by the tapered head of the bolt 32, and a helical groove 36 is formed in its periphery. A similar anchorage block 37, having a helical groove 38 is secured to the bottom 17 of the casing 15 by a stud that, in the present case, is formed integral with the block and passes through an aperture in the bottom of the casing for the application of a nut 39 therebeyond. A comparatively stiff helical spring 40 has the end convolutions of its opposed extremities engaged within the grooves of the anchorage blocks 35 and 37. Thus the spring not only resiliently supports the seat 30, but holds it against undue upward movement, or the withdrawal of the plunger 25 from the casing 15.

It may be pointed out as an important feature of my invention that the casing 15 and tube 25 are practically air tight at their respective upper and lower ends; and that the sliding joint between them is sufficiently close to prevent rapid escape or admission of air. Consequently the structure acts as a dash pot to retard the descent of the seat, and as a suction device to prevent its too rapid ascent. The effect is, therefore, that of a shock absorber to render more comfortable the riding qualities of the vehicle.

For the purpose of excluding dust from the sliding joint between the plunger and the casing, I enclose the upper ends of these parts by a jacket 42 of flexible material secured at its upper and lower ends by clamping means 43 to the plunger and casing, respectively.

Having thus described my invention, what I claim is:—

1. In a seat support for vehicles, the combination of telescoping tubes of such cross-sectional shape as to hold them against relative turning, one of said tubes having the seat operatively connected to it, and the other being carried by the vehicle, a closure for the outer end of each tube, an anchorage member within each tube and attached to the closure thereof, and a spring having its ends secured to said anchorage members.

2. In a seat support for vehicles, the combination of telescoping tubes that are square in cross-section one of said tubes having the seat operatively connected to it and the other being carried by the vehicle, a closure for the outer ends of each tube, anchorage members within the tubes and connected one to each closure, a spring encased within the tubes and having its ends connected to the anchorage members, and a flexible cover enclosing the joint between the tubes and having its opposite ends attached to the respective tubes.

3. In a seat supporting structure for vehicles, the combination of a shell carried by the vehicle frame and having a top wall provided with an aperture, a tubular casing having its upper end fitted within said aperture and its lower end bearing upon the vehicle frame and secured against movement with respect thereto, and a plunger reciprocable within said tubular casing, said plunger having provision for the operative connection of a seat thereto.

4. In a seat supporting structure for vehicles, the combination of a shell carried by the vehicle frame and having a top wall provided with an aperture, a plate vertically disposed within the shell and having connection therewith, a tubular casing having its upper end confined within the aperture and its lower end bearing upon the vehicle frame and attached to the aforesaid plate, and a plunger reciprocable within the tubular casing, the plunger having provision for the operative connection of a seat thereto.

5. In a seat supporting structure for vehicles, the combination of a shell carried by the vehicle frame and having a top wall provided with an aperture, a plate disposed vertically within the shell in substantially the plane of one side of the aperture and connected to the shell, a tubular casing having its upper end confined within the aperture of the shell, the side wall of the casing adjacent the aforesaid plate extending below the remaining portion of the casing and engaging the vehicle frame, the extension of the side wall having connection with the aforesaid plate, and a plunger reciprocable within the casing, the plunger having provision for the operative connection of a seat thereto.

6. In a seat supporting structure for vehicles, the combination of a vertically disposed plate 8 fixed with respect to the vehicle frame, a tubular casing 15 adjacent said plate and having one of its side walls extended downward below the bottom of the casing and turned forwardly for bearing upon the vehicle frame, a bottom 17 applied to the casing having a depending flange 19 adjacent the extended wall of the casing, securing means 20 attaching said flange and the wall to the aforesaid plate, a shell 6 fixed with respect to the plate and embracing the upper end of the casing, and a plunger 25 reciprocable within the casing, the plunger being adapted to have operative connection with a seat.

7. In a seat supporting structure for vehicles, the combination of a shell secured to the vehicle frame and having a top wall provided with an aperture, a vertical plate disposed transversely of the shell and having its top and side edges secured thereto, a tubular casing having its upper end confined within said aperture and one of its side walls extended downwardly below the bottom of the casing for bearing upon the vehicle frame, means securing the extended side wall of the casing to the aforesaid plate, and a plunger reciprocable within the casing and being adapted for operative connection to a seat.

In testimony whereof, I hereunto affix my signature.

BOUDEWIJN B. NEUTEBOOM.